United States Patent
Orr et al.

(10) Patent No.: US 9,558,479 B1
(45) Date of Patent: Jan. 31, 2017

(54) SYSTEMS AND METHODS FOR VERIFICATION OF IDENTITY AND LOCATION

(71) Applicant: Confinement Telephony Technology, LLC, Greensboro, NC (US)

(72) Inventors: Charles David Orr, Burlington, NC (US); John Vincent Townsend, Kernersville, NC (US); Zachary Alan Way, Greenboro, NC (US); Peter Slauta, III, Graham, NC (US); Ronald Natham Owens, Greensboro, NC (US)

(73) Assignee: CONFINEMENT TELEPHONY TECHNOLOGY, LLC, Greensboro, NC (US)

( * ) Notice: Subject to any disclaimer, the term of this patent is extended or adjusted under 35 U.S.C. 154(b) by 0 days.

(21) Appl. No.: 14/936,246

(22) Filed: Nov. 9, 2015

Related U.S. Application Data

(63) Continuation of application No. 14/460,689, filed on Aug. 15, 2014, now Pat. No. 9,197,742.
(Continued)

(51) Int. Cl.
*H04M 15/00* (2006.01)
*G06Q 20/14* (2012.01)
(Continued)

(52) U.S. Cl.
CPC ............ *G06Q 20/145* (2013.01); *G06Q 20/24* (2013.01); *G06Q 20/40* (2013.01);
(Continued)

(58) Field of Classification Search
CPC .. H04M 15/06; H04M 3/42042; H04M 1/575; H04M 1/57; H04M 3/436
(Continued)

(56) References Cited

U.S. PATENT DOCUMENTS 5,550,897 A * 8/1996 Seiderman ............. G06Q 20/04
379/114.19
5,802,156 A * 9/1998 Felger ..................... G06Q 20/12
379/114.14

(Continued)

OTHER PUBLICATIONS

Notice of Allowance from related U.S. Appl. No. 14/460,689 dated Jul. 22, 2015, 5 pages.

*Primary Examiner* — Quoc D Tran
(74) *Attorney, Agent, or Firm* — FisherBroyles, LLP; Eugene B. Joswick

(57) ABSTRACT

Techniques for verifying identity and/or location of a customer. One embodiment involves receiving a customer-provided address from a customer in a communication via a computer network or telephone network. The customer is a person or entity paying to receive calls from a resident of a controlled access residential institution. The embodiment further involves accessing a computer system to identify location information associated with the customer, the location information derived from additional information within or about the communication and determining a reliability estimate of the customer-provided address by comparing the customer-provided address with the location information associated with the customer that was identified based on the additional information. The embodiment may involve notifying a telecommunications provider, the controlled access residential institution, or law enforcement based on the reliability estimate of the customer-provided address.

5 Claims, 3 Drawing Sheets

Related U.S. Application Data

(60) Provisional application No. 61/866,221, filed on Aug. 15, 2013.

(51) Int. Cl.
  *G06Q 20/24* (2012.01)
  *G06Q 20/40* (2012.01)
  *H04M 3/42* (2006.01)

(52) U.S. Cl.
  CPC ... *H04M 3/42059* (2013.01); *H04M 3/42348* (2013.01); *H04M 15/47* (2013.01); *H04M 15/705* (2013.01)

(58) Field of Classification Search
  USPC .............. 379/142.01, 142.06, 114.05, 114.2
  See application file for complete search history.

(56) References Cited

U.S. PATENT DOCUMENTS

| | | | |
|---|---|---|---|
| 8,761,360 B1 | 6/2014 | Gongaware et al. | |
| 9,197,742 B1* | 11/2015 | Orr | H04M 3/42085 |
| 2003/0002639 A1* | 1/2003 | Huie | G06Q 30/04 |
| | | | 379/114.27 |
| 2003/0138084 A1* | 7/2003 | Lynam | H04M 3/38 |
| | | | 379/114.14 |
| 2008/0000966 A1 | 1/2008 | Keiser | |
| 2013/0263227 A1 | 10/2013 | Gongaware et al. | |
| 2014/0278212 A1* | 9/2014 | Torgersrud | G01B 21/16 |
| | | | 702/150 |
| 2014/0280559 A1* | 9/2014 | Torgersrud | H04L 67/22 |
| | | | 709/204 |

* cited by examiner

SYSTEMS AND METHODS FOR VERIFICATION OF IDENTITY AND LOCATION

CROSS-REFERENCES TO RELATED APPLICATIONS

This application is a continuation application of U.S. patent application Ser. No. 14/460,689 filed on Aug. 15, 2014, now allowed, which claims the benefit of U.S. Provisional Application No. 61/866,221 filed Aug. 15, 2013, the contents of which are incorporated herein in their entirety.

FIELD OF THE INVENTION

The present disclosure relates to confirming the identity and location of customers receiving telephone calls from residents within a controlled access residential institution.

BACKGROUND OF THE INVENTION

In the context of the operation of telecommunication systems which serve controlled access residential institutions such as a correctional facility, many problems are traditionally observed relating to the abuse and/or inability to effectively capture the identity and location of the called, non-resident party. Typically, the task of determining the identity and location of the called parties, or "customers," falls upon the telecommunications provider. The telecommunications provider must rely upon the information provided from the customer during the initial account setup. Traditionally, telecommunications providers allow multiple methods for a customer to setup an account, exasperating the problem.

In one common example customers are allowed to setup an account by calling an interactive voice response, or "IVR", system maintained by the telecommunications provider. By calling the IVR a customer is allowed to setup an account and to place funds on a prepaid account with the use of a credit card or prepaid credit card. Once the account is funded, the resident of the correctional institution may call the customer.

In another common example customers are allowed to setup an account by funding their telephone number through a variety of third party payment services, such as Western Union or Money Gram. Typically, customers are only required to provide the telephone number where they desire to receive calls. The telephone number will either become the account number or be linked to an account number with the telecommunication provider. Name and/or address are typically not required by third party payment services.

Yet another common example would be to validate the address of a customer through the billing address of the credit card used to fund the prepaid account. Typically, telecommunication providers will validate the zip code and any other numeric address information if available on the credit card being used to fund an account. In some instances customers will fund an account using a prepaid credit card which does not validate a customer's identity or location when setup. In other instances customers will use a credit card that has been provided by a family member, loved one, or friend to help setup the account.

In another common example the customer will provide false information so that their identity and location are kept secret from the telecommunications provider, correctional institutions, and law enforcement.

In another common example the customer will utilize a third party service so that their identity and location are masked from the telecommunications provider and correctional institution. Typically, customers will setup an account with the third party service provider that will provision the customer with a telephone number that the customer will then provide to the telecommunications provider and/or correctional institution. This telephone number may or may not be local to the correctional institution. When the resident within the correctional institution calls the number the third party service provider will forward the number to the customer's real telephone number. In some examples the third party service will provide false billing information to the customer or offer to connect the customer to the telecommunications provider customer service in which they are able to setup the account. By connecting the customer with the telecommunications provider customer service, the third party service is able to mask the true caller identity of the customer and pass the newly provisioned phone number to the telecommunications provider as the caller identity.

SUMMARY OF THE INVENTION

One embodiment involves receiving a customer-provided address from a customer in a communication via a computer network or telephone network. The customer is a person or entity paying to receive calls from a resident of a controlled access residential institution. The embodiment further involves accessing a computer system to identify location information associated with the customer, the location information derived from additional information within or about the communication and determining a reliability estimate of the customer-provided address by comparing the customer-provided address with the location information associated with the customer that was identified based on the additional information. The embodiment may involve notifying a telecommunications provider, the controlled access residential institution, or law enforcement based on the reliability estimate of the customer-provided address.

Verifying a customer's location may involve requesting supporting documentation based on a reliability estimate of the customer-provided address and restricting calls to the customer from the resident upon a failure to provide the supporting documentation.

A reliability estimate may also be used to determine that the customer-provided address should not be used for determining a rate to charge the customer. An actual location of the customer may be determined that is different from the customer-provided address and the rate to charge the customer may be based on the actual location. The telecommunications provider, the controlled access residential institution, and/or law enforcement may be notified based on a failure by the customer to provide supporting documentation and/or based on a rate adjustment being applied.

Verifying a customer's location can involve requesting and/or receiving additional information from the customer including, but not limited to, customer-provided supporting identity documentation such an image of a photo identification card or license comprising the location information or an image of a postal correspondence comprising the location information. An image may be electronic or something that reproduces an original on paper or other physical medium and may take the form of a fax, a scan, a copy of a document sent via postal mail, etc. The additional information may be a computer readout of a photo identification card, license, or other customer item storing the additional information. For example, the additional information may be data retrieved from a magnetic strip or other storage mechanism associated with a driver's license or credit card or information retrieved from an RFID transponder on a personal item of the customer. The additional information may be an internet protocol address associated with the source of the communication, a telecommunication provider's call detail record, information provided by a third party billing service or web-based geo-location service or an assisted global positioning system (aGPS) service. The additional information may be a telephone area code associated with the source of the communication or an area code and prefix (NPA/NXX) of an incoming caller identification.

Based on the results of attempting to verify a customer's location, a customer account record may be updated with location information, calls to the customer from the resident may be restricted, and/or a telecommunications provider, the controlled access residential institution, and/or law enforcement may be contacted.

A customer may be incentivized to provide location verification information in various ways. For example, a subscription service option may be offered to a customer for a monthly fee during establishment of a customer account for the customer that has funds for paying for the customer to receive calls from a resident of a controlled access residential institution. Based on the customer selecting the subscription service option, the customer may have agreed to provide verifiable location information to allow additional location information to be accessed, for example from a separate computer system or service, to verify the purported customer's location.

These embodiments and aspects of certain embodiments are provided to introduce the subject matter of this patent. The claims define the scope of the patent and should not be limited based on this summary.

DETAILED DESCRIPTION

Figure 1:
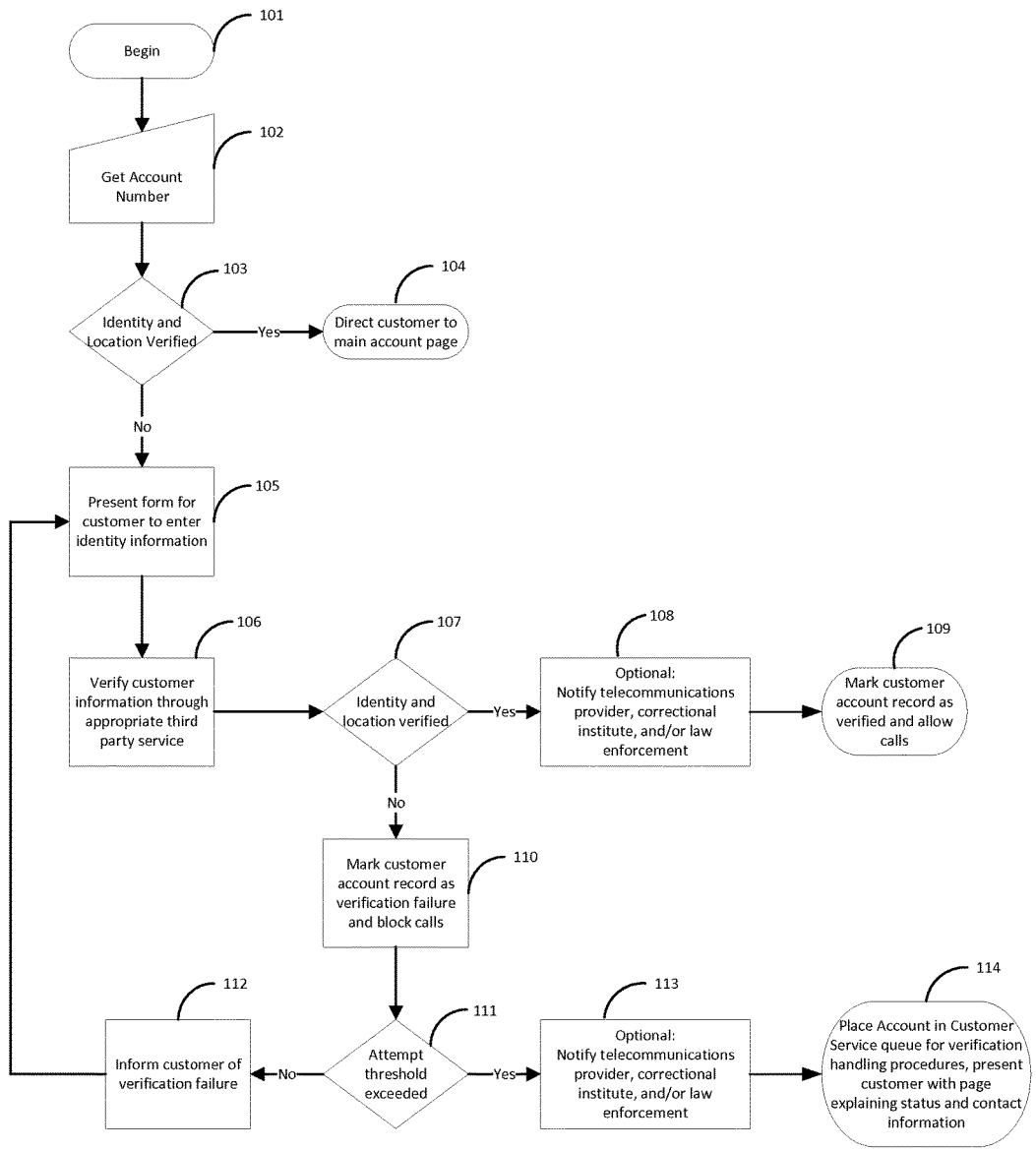
FIG. 1 is a flowchart illustrating functions performed by a Web-based Application for obtaining and verifying the identity and location of a customer.

In accordance with one aspect of an illustrative embodiments of the present invention, customer identification and location verification are accomplished by an automated computer software system which is integrated at multiple levels with the operation and provision of customer accounts, billing services, databases contained within the telecommunications provider and third party sources.

An automated software system providing one or more of the features disclosed herein may be included in or added to a telecommunications system in various ways, and may make use of various modules, some of which are operated independently, and some of which advantageously integrate with existing systems in order to obtain maximum efficiency, transparency and accountability. Components or modules providing one or more of the features disclosed herein may be provided via one or more computers or other electronic devices located at an institutional facility, at a centralized and/or remote telephone network or computer network locations, located at any other location, or located at any combination of such locations.

A customer account interface system is provided that enables customer identity verification. The customer account interface system provides methods and techniques which enable customers to access and interact with the customer account interface system by way of various means, including, but not limited to, web-based browser applications, custom software applications designed for mobile telephone, tablet computer, or kiosk use, specifically formatted electronic mail or SMS messages, and interactive voice response telephony systems. The devices may include optical scanners or cameras. In some embodiments, such devices include or attach to scanners or cameras that are customized for scanning or imaging particular types of documents such as driver's licenses. In one embodiment, a kiosk with a driver's license scanner is located at the institutional facility.

Further, the customer account interface provides a means for a customer to update their identity verification information. Identity verification information, including, but not limited to, driver's license number, social security number, major credit card, student ID, and state issued ID.

The present invention provides a means to validate that an address associated with an account at the telecommunications provider is the same as an address determined to be associated with a person setting up and/or using that account. For example, a person may set up an account by providing false location for the account, e.g., stating that he lives in Chicago, and various techniques can be used to invalidate that address, e.g., identifying the he actually lives in Detroit. Such verification can involve using identity information to obtain information about the person's actual residence address. Publically available and other sources may be used for such verification. Public sources, include, but are not limited to, a credit bureau, bank, department of motor vehicles, third party verification services, and USPS verification. In one example, the system requires that the person provide personal identifying information such as social security number, full name, etc. and uses that information to search external sources such as public records associated with that person to verify the person's residence address. In another example, the system will compare the credit card billing address, zip code, and name on an account associated with the credit card used to fund the account with the identity information provided by the customer. In yet another example, the system will compare the driver's license number with data extracted from the state Department of Motor Vehicle (DMV) or third party verification services. If the customer account interface system fails to validate the identity of a customer, the customer will be notified that they will be unable to receive calls from the correctional institution until such time as they are able to satisfy the identify/address verification process. Additionally, the system will optionally notify the telecommunications provider, correctional institution, and/or law enforcement of the failed verification.

Verifying the accuracy of a location associated with an account with respect to the location of the customer associated with an account can additionally or alternatively involve the use of other customer provided documents and information. In one embodiment, the customer account interface system allows a customer to transmit a copy of identification documentation through the means of a copy, scan, or picture. Such documentation will generally have both address location and identification information and, as examples may include driver's licenses, green cards, passports, invoices, utility bills, and other correspondence, and picture IDs. In one example, in the event the customer account interface system is unable to verify the identity of a customer with the customer supplied driver's license number, the system may require the customer to transmit an electronic copy of the driver's license. Once received the system will automatically verify the name, address, and driver's license number with the information provided by the customer, any error identified will be automatically corrected and the system will try to re-verify the customer's data. This process provides for a dual form of verification, e.g. the telecommunications provider is able to verify the customer supplied identification matches physical identification the customer has in possession and it allows for automatic error detection of customer entered information. If verification continues to fail, the system will place the customer account into a customer service queue for manual verification. Additionally, the customer account interface provides for a variety of transmission methods, including, but not limited to, SMS, custom software applications designed for mobile telephone or tablet computer, email, facsimile, postal mail, social media such as Facebook, Twitter, etcetera.

The customer account interface system may mark an account not verified, prevent the customer from receiving calls from the correctional facility, and optionally notify the telecommunications provider, correctional institution, and/or law enforcement until the customer's ID has been received and/or verified through the system. Upon successful receipt and verification the customer account interface system will automatically mark the account as verified and allow calls to be completed to the customer from the correctional institution.

Still further, the present invention provides a means to validate the identity information against the telecommunications providers billing data from its vendor's call detail records. In one example, the telecommunications provider may compare a call from their call detail record (CDR) to the billing CDR's provided from the terminating telecommunication's provider to verify accuracy of location information.

In accordance with another aspect of illustrative embodiments of the current invention, a system is provided which advantageously incorporates data elements from payment methods, including, but not limited to, third party payment services such as Western Union and Money Gram, telecommunications provider web site, and interactive voice response systems.

Data elements, included, but not limited to, location where the customer submitted the payment through a third party payment provider, IP address of the customer's electronic device used to access the telecommunications provider web site or third party payment provider, and caller ID of the phone used to access the IVR.

The present invention provides a means for the telecommunications provider to process the data elements against publically available sources for verification. Verification, includes, but is not limited to, comparing the location of the payment from third party payment services with the account location supplied by the customer.

Further, the telecommunications provider may use web based geolocation application programming interfaces (APIs) or assisted GPS (aGPS) services to identify the customer's location while accessing the telecommunication provider's web site, payment systems, or IVR. For example, a person may set up an account by providing false location for the account, e.g., stating that he lives in Chicago, however, through the utilization of web-based geolocation APIs, the system may determine that the customer only accesses the telecommunication providers website and payment systems from a location in Seattle. Still further, the telecommunications provider may use the NPA/NXX of the incoming caller ID and compare its location with the telephone number and location information provided on the customer account. Upon correlation of this abstract data the telecommunications provider may elect to mark the customer account as a verification failure, block calls, and optionally notify the telecommunications provider, correctional institution, and/or law enforcement until such time that the customer can re-verify their identity and location information.

In accordance with yet another aspect of illustrative embodiment of the current invention, systems are provided which enable applications designed for mobile telephone or tablet computers to report location information, including, but not limited to, GPS, tower triangulation, and IP geolocation services.

In accordance with yet another aspect of illustrative embodiment of the current invention, the telecommunications provider may offer a subscription service to the customer. The customer will have the option of selecting the subscription service during the account setup for a nominal monthly fee. By selecting the subscription service, the customer will be required to provide positive identification and location information. Upon verification of identity information, the customer is offered a reduced per minute rate to utilize the telecommunications provider services.

Further, by maintaining the actual telephone number for the customer and by recording positive identification and location information the telecommunications provider is able to ensure the integrity of their database, allowing for enhanced intelligence and security for the correctional institutions, law enforcement, and customers.

In accordance with yet another aspect of an illustrative embodiment of the current invention, if the telecommunications provider determines that the customer provided location is not consistent with location data elements the telecommunications provider will allow calls to the customer at the rate consistent with the location data elements obtained through these systems.

Further, upon making the determination that the location is not consistent with the location data elements the telecommunications provider will contact the customer through the use of an IVR system or live customer service representative to obtain the correct location information and/or inform the customer of the correct rates for their telephone calls received from the correctional facility. Additionally, the customer can be given information on how to close the account and request a refund from the telecommunications provider.

The telecommunications provider may elect to re-verify identity and/or location data at random intervals to ensure the data is accurate, in the event that a re-verification fails the telecommunications provider may elect to mark a customer account record as verification failure and block calls or to bill calls using a rate appropriate for the location where the calls are being received.

In any event of verification failure, whether it be the initial verification or random re-verification, the systems will optionally notify the telecommunication provider, correctional institution, and/or law enforcement of the failure. Upon the system processing customer providing documentation and the system successfully validating the customer's identity and location the system will automatically notify the telecommunications provider, correctional institution, and/or law enforcement of any updates and the successful verification. Notification may be provided by way of various means, including, but not limited to, through web-based browser applications, custom software applications designed for mobile telephone or tablet computer use, specifically formatted electronic mail or SMS messages, and automated telephony systems.

FIG. 1 illustrates an exemplary process performed by Web-based Application for obtaining and verifying the identity and location of a customer. Controls are provided to ensure verification of the account, using Personal Identification Numbers (PINS) and Security Questions.

The process begins at box 101 when a customer accesses a web site and enters the account number at box 102. At decision box 103 the account is checked to see if valid identity and location information is on the account. Upon verification of valid identity and location information, the process continues to box 104 at which the customer is presented with their main account page. If valid identity and location information does not exist in telecommunications provider database, the customer is presented with a form prompting the customer to provide information at box 105.

The customer selects the identification they wish to provide and enters their information, at box 106 the information is validated against public accessible third party services. At decision box 107, if the identity and location information is successfully validated the system may optionally notify the telecommunications provider, correctional institute, and/or law enforcement at box 108 and at box 109 the customer account is marked as verified and allowed to receive telephone calls. If the identity and location information as entered by the customer fails to pass verification the customer account record is marked as verification failure and calls are blocked at box 110. The customer is allowed 'X' number of attempts to enter in valid identity and location information at decision box 111, if the attempt threshold has not been exceeded the customer is informed of verification failure at box 112 and redirected back to box 105 to supply valid information. If at decision box 111 the attempt threshold has been exceeded the system may optionally notify the telecommunications provider, correctional institute, and/or law enforcement at box 113 and the customer is presented with a page explaining the status and given the telecommunications provider contact information. Additionally the account may be placed in a customer service queue for manual verification handling procedures at box 114.

Figure 2:
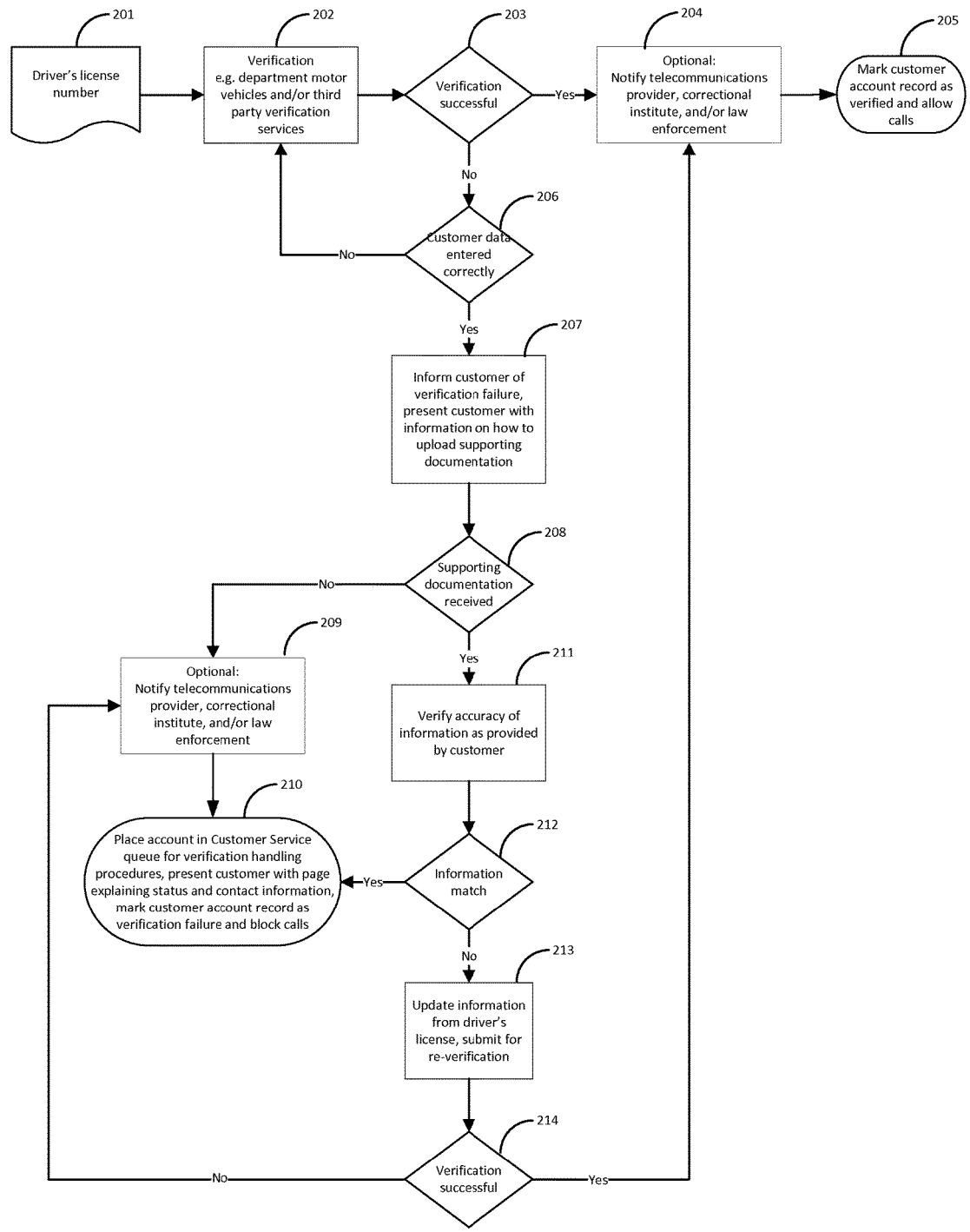
FIG. 2 is a flowchart illustrating functions performed by a customer account interface system to verify the identity and location of a customer from a driver's license.

FIG. 2 illustrates the process performed by the customer account system for verifying the identity and location of a customer by means of a customer supplied driver's license. The process may be a sub process to process defined in FIG. 1 and may take place during the verification of customer supplied data in box 106.

The customer selects to enter their driver's license information at box 201. At box 202 the information is validated against public accessible third party services such as the department of motor vehicles and/or third party verification services. At decision box 203, if the identity and location information is successfully validated optionally the system will notify the telecommunications provider, correctional institute, and/or law enforcement at box 204 and the customer account is marked as verified and is allowed to receive telephone calls at box 205. If the identity and location information as entered by the customer fails to pass verification, the customer is asked to confirm the data entered at box 206. If the data is incorrect, the customer is given the opportunity to correct the data and is sent back to box 202 for verification. If the data is correct as entered, the customer is informed of verification failure and is asked to provide supporting documentation at box 207. Supporting documentation may include but is not limited to a copy or image of the customer's driver's license, utility bill, passport, and/or invoice. Supporting documentation may be supplied to the telecommunications provider through the process of uploading the documentation via a scanned copy, pdf, photograph, or by fax, email, postal mail, etcetera. At decision box 208, if the customer has failed to successfully upload a copy of their supporting documentation the system may optionally notify the telecommunications provider, correctional institute, and/or law enforcement at box 209 then marks the account record as verification failure and blocks calls at box 210. If the customer successfully uploads a copy of their supporting documentation the system compares the data entered by the customer to the data on the supporting documentation at box 211. If the data matches at decision box 212 the customer account is placed in a customer service queue for manual verification handling procedures, the customer is informed of the status and provided contact information, the customer account record is marked as verification failure, and calls are blocked at box 210. Alternatively, the telecommunications provider may elect to mark an account for manual verification but to allow calls provided the customer entered data and the customer supplied data match. If at decision box 212 the data is inconsistent the system will automatically update the customer account record with the data from the supporting documentation at box 213 and send back for verification. At decision box 214 if the customer account continues to fail verification the system may optionally notify the telecommunications provider, correctional institute, and/or law enforcement at box 209, the account is placed in a customer service queue for manual verification handling, the customer is presented with the status and contact information, the account record is marked as verification failure, and calls are blocked at box 210. If the customer account passes verification at decision box 214, the system may optionally notify the telecommunications provider, correctional institute, and/or law enforcement at box 204 then the customer account record is marked as verified and calls are allowed at box 205.

The previous process may be the substantially the same regardless of the source of identity, e.g. driver's license, major credit card, social security card, photo ID, etcetera. At box 202 the criteria for successful verification may change based on the source of identity. In one example, the customer elects to provide a major credit card. Credit card data may be accepted through the web site, payment web site, custom application designed for a mobile phone or tablet computer, and on the IVR. Due to the complexities of capturing alpha characters via an IVR system the telecommunications provider may elect to only verify the numerical value of the street address, full address information, zip code, first and last name, last name, or any combination thereof. Additionally the website, payment web site, custom application designed for a mobile phone or tablet computer, and IVR may use different combinations of information for verification. In another example, customer elects to provide their Social Security number. The system may query the credit bureaus to find the last known address, additionally the system may verify the Social Security number matches the first and last name of the customer, the Social Security number issue date is within a valid date range, the Social Security number is not listed as deceased, etcetera.

In yet another example, customer elects to provider their driver's license number. The system may query the appropriate department of motor vehicles and/or third party verification systems to ensure the zip codes matches the state and the last name matches the address provided by the customer.

Figure 3:
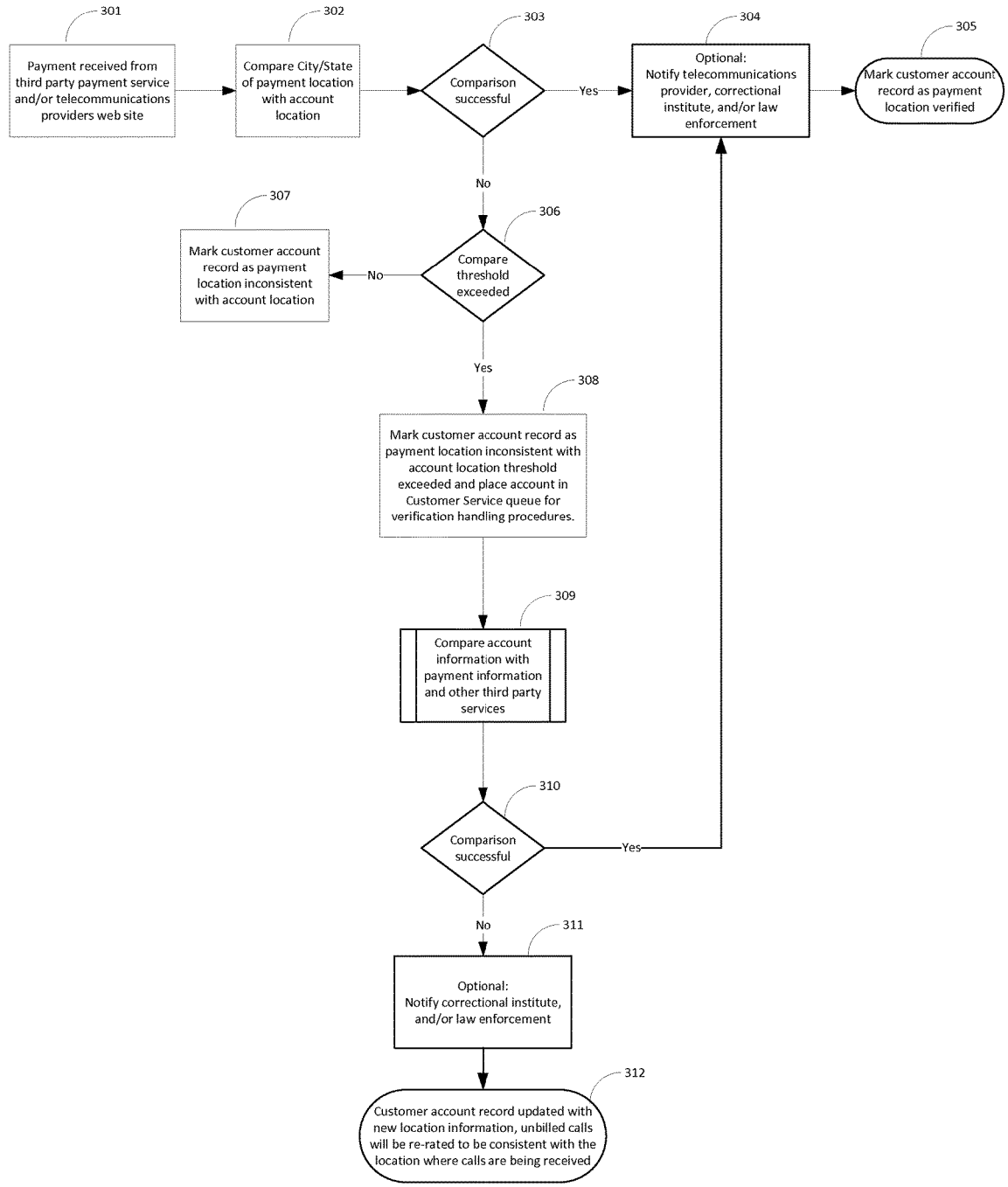
FIG. 3 is a flowchart illustrating functions performed by a customer account interface system to verify the location where a customer is making payments on account is consistent with the account location.

FIG. 3 illustrates the functions performed by a customer account interface system to verify that the location where a customer is making payments on account is consistent with the account location.

At box 301 the telecommunication provider receives a payment on an account from a customer through a third party billing service or via the telecommunication provider's website. The payment may be in any form e.g. Western Union, Money Gram, check, credit card, etcetera. At box 302 the location, e.g., city and state, of where the payment is made is compared against the location data on the account record with the telecommunications provider. The payment location data may be extracted through various methods including data elements provided by a third party payment service and web based geolocation or assisted GPS (aGPS) services utilized by the telecommunications provider. At box 303 if the comparison is successful optionally the system will notify the telecommunications provider, correctional institute, and/or law enforcement at box 304 then the customer account is marked as payment location verified at box 305. However, if at box 303 the comparison is unsuccessful the number of unsuccessful comparisons is evaluated at box 306. In order to accommodate customers traveling, daily movements, etcetera, customers are allowed a threshold 'X' amount of unsuccessful payment address verifications prior to being placed in a customer service queue for manual verification by the telecommunications provider. If at box 306 the threshold has not been exceeded, the customer record will be marked as payment location is inconsistent with account location at box 307. However, if at box 306 the threshold has been exceeded, the customer account will be placed in a customer service queue for verification and the account record will be marked that payment location is inconsistent with account location threshold has been exceeded at box 308. At box 309 the account information is compared with payment information and other third party verifications services, additionally the telecommunications provider may contact the customer to validate location information. If the telecommunications provider is able to successfully compare location information at box 310 the system may optionally notify the telecommunications provider, correctional facility, and/or law enforcement at box 304 then the account record will be marked as payment location verified at box 305. However if at box 310 the telecommunications provider determines the actual customer location is different from the account location, the system may optionally notify the correctional institute and/or law enforcement at box 311 and the account will be updated with the new location and the telecommunications provider will have the option to re-rate unbilled calls with the correct location where the calls are being received and all future calls at box 312. Alternatively, the telecommunications provider may mark the customer account as verification failure and block calls until such time the customer can re-verify their location information.

Any suitable computing system or group of computing systems can be used to implement the processes disclosed herein. In one embodiment a computer server is used to conduct and/or manage communications with a customer. Such a server can include a processor that is communicatively coupled to a memory and that executes computer-executable program code and/or accesses information stored in the memory. The processor may comprise a microprocessor, an application-specific integrated circuit ("ASIC"), a state machine, or other processing device. The processor can include any of a number of processing devices, including one. Such a processor can include or may be in communication with a computer-readable medium storing instructions that, when executed by the processor, cause the processor to perform the operations described herein.

The memory can include any suitable computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The server may also comprise a number of external or internal devices such as input or output devices. For example, the server may have input/output ("I/O") interface that can receive input from input devices or provide output to output devices. A bus can also be included in the server. The bus can communicatively couple one or more components of the server. The server can execute program code that configures the processor to perform one or more of the operations described above with respect to FIGS. 1-3. The program code may be resident in the memory or any suitable computer-readable medium and may be executed by the processor or any other suitable processor. In additional or alternative embodiments, program code can be resident in a memory that is accessible via a data network, such as a memory accessible to a cloud service.

The server can also include at least one network interface device. The network interface device can include any device or group of devices suitable for establishing a wired or wireless data or telephone connection to one or more networks. Non-limiting examples of a network interface device include an Ethernet network adapter, a modem, and/or the like. A server can transmit messages as electronic or optical signals via the network interface device.

A customer's device be a computer, telephone, mobile device, or any another communications device. A communications device can include a processor, memory, a bus, input/output components, network interface components, and other appropriate communication components. Non-limiting examples of input devices include a touch screen (e.g., one or more cameras for imaging a touch area or pressure sensors for detecting pressure changes caused by a touch), a mouse, a keyboard, or any other device that can be used to generate input events in response to physical actions by a user of a computing device, or a microphone. Non-limiting examples of output devices include an LCD screen, an external monitor, a speaker, or any other device that can be used to display or otherwise present outputs generated by a computing device. The mobile device can execute program code that configures the processor to perform one or more of the operations described above with respect to FIGS. 1-3.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

The foregoing description and summary of the invention are to be understood as being in every respect illustrative and exemplary, but not restrictive, and the scope of the invention disclosed herein is not to be determined only from the detailed description of illustrative embodiments but according to the full breadth permitted by the patent laws. It is to be understood that the embodiments shown and described herein are only illustrative of the principles of the present invention and that various modification may be implemented by those skilled in the art without departing from the scope and spirit of the invention.

What is claimed:

1. A method for restricting a resident of a controlled access residential institution from using funds in an account to make calls to a customer who funds the account based on customer location inconsistency, comprising:
   receiving information from the customer to set up an account, the information identifying a customer location at which the customer will receive calls from the resident, information received by a telecommunications provider in a communication via a computer network or telephone network;
   setting up the account based on the customer location provided by the customer for the account;
   receiving payments from the customer to provide the funds for the account;
   determining a payment system access location of a customer device used by the customer to access the payment system to make the payments to provide the funds for the account;
   determining that the payment system access location of the customer device is different from the customer location provided by the customer for the account; and
   based on a difference between the payment system access location of the customer device and the customer location provided by the customer for the account, restricting the resident from using the account to call the customer.

2. The method of claim 1, wherein determining the payment system access location of the customer device comprises determining an Internet Protocol (IP) address of the customer device used by the customer to access the payment system.

3. The method of claim 1, wherein determining the payment system access location of the customer device comprises using a web-based geolocation application programming interface (API) to determine where the customer device is while accessing the payment system.

4. The method of claim 1, wherein determining the payment system access location of the customer device comprises using assisted global positioning system (aGPS) services to determine where the customer device is while accessing the payment system.

5. The method of claim 1, wherein determining the payment system access location of the customer device comprises using the NPA.NXX of an incoming caller ID to determine where the customer device is while accessing the payment system.

* * * * *